United States Patent
Kumagai

[11] Patent Number: 6,072,658
[45] Date of Patent: Jun. 6, 2000

[54] CASSETTE MOUNTING DEVICE HAVING LINK MECHANISM ARRANGED TO SUPPORT CASSETTE HOLDER

[75] Inventor: Kiyoshi Kumagai, Kanagawa-ken, Japan

[73] Assignee: Canon Kabushiki Kaisha, Tokyo, Japan

[21] Appl. No.: 08/615,675

[22] Filed: Mar. 14, 1996

[30] Foreign Application Priority Data

Mar. 22, 1995 [JP] Japan .................................. 7-062484

[51] Int. Cl.[7] .................................................. G11B 15/675
[52] U.S. Cl. ........................................ 360/96.5; 242/338.4
[58] Field of Search ............................ 360/96.5, 96.6, 360/99.06, 99.07, 99.02, 99.03; 369/75.2, 77.2; 242/338.4

[56] References Cited

U.S. PATENT DOCUMENTS

| | | | |
|---|---|---|---|
| 4,369,474 | 1/1983 | Kamimura et al. | 360/96.5 |
| 4,484,240 | 11/1984 | Yoshida | 360/96.5 |
| 4,794,478 | 12/1988 | Kamezawa et al. | 360/96.5 |
| 5,390,055 | 2/1995 | Maehara et al. | 360/96.5 |
| 5,481,419 | 1/1996 | Fujishiro | 360/96.5 |
| 5,497,278 | 3/1996 | Nagatsuka et al. | 360/96.5 |
| 5,784,222 | 7/1998 | Nawa et al. | 360/96.5 |
| 5,831,789 | 11/1998 | Nishikawa | 360/96.5 |

OTHER PUBLICATIONS

Japanese Patent Abstract of JP 08–050750, Nagatsuka, Feb. 20, 1996.

*Primary Examiner*—Craig A. Renner
*Attorney, Agent, or Firm*—Robin, Blecker & Daley

[57] ABSTRACT

A cassette mounting device is arranged to hold a cassette with a cassette holder and to support the cassette holder to be movable upward or downward relative to a chassis between raised and lowered positions. X-shaped links are disposed on both sides of the cassette holder and shaft pin parts of two interconnected levers are arranged to be slidable in a state of engaging cam slot parts of the chassis on the sides where these levers are mounted on the chassis. The cam slot parts are formed aslant, at least at their parts corresponding to the raised and lowered positions of the cassette holder, at such an angle of inclination that the shaft pin parts relatively move upward when the cassette holder descends.

8 Claims, 9 Drawing Sheets

CASSETTE MOUNTING DEVICE HAVING LINK MECHANISM ARRANGED TO SUPPORT CASSETTE HOLDER

BACKGROUND OF THE INVENTION

1. Field of the Invention

This invention relates to a cassette mounting device for mounting and demounting a cassette on and from the body of a recording and/or reproducing apparatus such as a VTR by moving a cassette holder up and down, and also relates to a recording and/or reproducing apparatus provided with such a cassette mounting device.

2. Description of the Related Art

Cassette mounting devices which have heretofore been arranged to mount and demount a tape cassette on and from the body of, say, an 8 mm VTR or the like car be divided into two types. One is an automatic loading (or front loading) type which is arranged to be used for an installed type VTR and which is provided with a drive source. The other is a pop-up type which is arranged to be used for a camera-integrated type VTR and to be rendered operative when a cassette holder is pushed down by the operator of the VTR.

In the case of the latter pop-up type cassette mounting device, the simplification of mechanism and the reduction in weight thereof have advanced according to the recent trend of the reduction in size of the camera-integrated type VTR or the like and, as a result, the cassette mounting device has come to be usually arranged to have a lock mechanism for locking the cassette holder in its lowered position only on one side of the cassette holder. This arrangement is called a single-side(d lock type. However, since such a single-sided lock type cassette mounting device has an arrangement in which the pushing-down force is applied to the cassette holder directly by the operator, the reduction in size and weight has come to cause difficulty in arranging t-he cassette mounting device to adequately keep its function and strength and to give an adequate feeling of operation thereon.

FIGS. 6(a) and 6(b) to FIGS. 9(a) and 9(b) show the conventional cassette mounting device. Of these figures, FIG. 6(a) shows the cassette holder in its raised (popped-up) state. FIG. 6(b) shows the cassette holder in its lowered (locked) state. FIG. 7 is a top view of the whole cassette mounting device. The conventional cassette mounting device is described below with reference to those figures.

The illustrations include a tape cassette 1, a magnetic tape 2 contained within the tape cassette 1, and a main chassis 3 of a VTR body. A rotary drum 4 which has a plurality of recording/reproducing heads is disposed on the main chassis 3. A sliding chassis 5 is arranged to be slidable over the main chassis 3. A cassette holder 6 is arranged to allow the tape cassette 1 to be inserted therein. First and second levers 7 and 8 form X-shaped links on both sides of the cassette holder 6. A fulcrum shaft 9 is arranged in each of the X-shaped links to rotatably connect the first and second levers 7 and 8 to each other. A connection shaft 10 is arranged to interconnect one ends of the first levers 7 dispose(d on both sides of the cassette holder 6 for synchronizing the phases of the X-shaped links on the two sides and also serves to swingably support the first levers 7 on the cassette holder 6. A shaft pin 11 is disposed at the other end of each of the first levers 7. A cam slot 12 is formed in each of the side plates of the sliding chassis 5. The shaft pin 11 is engaging the cam slot 12. A shaft pin 13 is disposed at one end of each of the second levers 8 and is rotatably supported by each corresponding side plate of the sliding chassis 5. A cam slot 14 is formed in the other end of each of the second levers 8. A shaft pin 15 is arranged on each side plate of the cassette holder 6 to slidably engage the cam slot 14. A tension spring 16 stretches between each pair of the first and second levers 7 and 8 to exert an urging force for moving the cassette holder 6 up. Cassette retaining springs 17 are provided on the upper surface of the cassette holder 6. There is also provided a lid opener 18 for opening a lid 1a of the tape cassette 1.

Reel mounts 19 are disposed on the sliding chassis 5.

When the cassette holder 6 is pushed down against the force of the springs 16 after insertion of the tape cassette 1 into the cassette holder 6 in the popped-up state as shown in FIG. 6(a), the cassette holder 6 comes to its lowered position, as shown in FIG. 6(b), where the cassette holder 6 is locked and kept in the locked state by a lock mechanism 20, which is disposed on the side opposite to the illustrated side. The lid 1a of the tape cassette 1 is opened by the lid opener 18 while the cassette holder 6 is being moved down. With the cassette holder 6 in the locked state, the tape cassette 1 is mounted on the reel mounts 19 of the sliding chassis 5, while the cassette retaining springs 17 push the tape cassette 1 from above. After that, the sliding chassis 5 is slid in the direction of approaching the rotary drum 4 and, at the same time, the tape 2 is pulled out from the tape cassette 1 by means of a loading mechanism which is not shown. By this, at least a part of the rotary drum 4 is relatively inserted into an opening part of the cassette 1 in such a way as to have a portion of the tape 2 wrapped around the circumferential surface of the rotary drum 4. The tape 2 is then allowed to travel and signals are recorded or reproduced by the recording/reproducing heads of the rotary drum 4. In taking out the tape cassette 1, the operation is performed in the order reverse to the above-stated operation. When the sliding chassis 5 is slid in the direction of going away from the rotary drum 4, the tape 2 is rewound up into the tape cassette 1. After that, the cassette holder 6 is unlocked by an eject mechanism which is not shown. The X-shaped links are operated by the force of the springs 16 to move up the cassette holder 6 into the popped-up position as shown in FIG. 6(a).

The lock mechanism 20 is generally provided only on one side of the cassette holder 6, as mentioned above, for the purpose of reduction in size and weight of the cassette mounting device. Such being the arrangement, a positioning action on the side opposite to the locking side is carried out by causing the first and second levers 7 and 8 on this side to follow the phases of the first and second levers 7 and 8 disposed on the locking side, by means of the rigidity of the connection shaft 10 and the cassette holder 6. FIG. 8 shows, in an oblique view, how this positioning action of the link mechanism is carried out, in a simplified manner, omitting the cassette holder 6 from the drawing. The X-shaped link (the first and second levers 7 and 8) on the side opposite to the locking side is arranged to receive a lifting force which is a resultant force resulting from the lifting force of the springs 16, a reaction force caused by the cassette retaining springs 17 and a reaction force caused by a lid closing spring of the lid 1a of the tape cassette 1, and to suppress the resultant force mainly by the rigidity of the connection shaft 10.

FIGS. 9(a) and 9(b) are side views showing how a force is exerted on the side opposite to the locking side. In these figures, the link mechanism and parts therearound are shown in a simplified manner to facilitate understanding. FIG. 9(a) shows the popped-up state and FIG. 9(b) shows the locked state of the cassette holder 6. In the single-sided lock type cassette mounting device, the cassette holding action on the side opposite to the lock mechanism 20 is performed, as mentioned above, through the connection of the right and left links made, as mentioned above, mainly by the connection shaft 10 and the first levers 7. To prevent the tape cassette 1 from being inadequately held due to looseness of fitting engagement of the shaft pin 11, the cam slot 12, etc., and an inadequate machining precision, it is generally practiced to provide a phase difference in interconnecting the first levers 7 and 7' which are respectively disposed on the locking side and the non-locking side. In FIG. 9(b), a two-dot chain line indicates the position of the first lever 7' which is disposed on the locking side. In contrast with this, the first lever 7 disposed on the side opposite to the locking side is set in a position deviating as much as a phase difference "h" from the other lever 7' in the direction of closing the link.

As a result of this discrepancy in position, a torque for closing the link as shown by an arrow T acts on the first lever 7 disposed on the side opposite to the lock mechanism 20. The torque T is balanced with the above-stated lifting force for the cassette holder 6, so that the cassette holder 6, i.e., the tape cassette 1, can be held in a correct position.

The link mechanism of the conventional cassette mounting device which is arranged in the above-stated manner is generally configured in the form of X link. The first and second levers 7 and 8 which jointly form each X-shaped link are rotatably connected approximately in the middle part of the X-shaped link by means of the fulcrum shaft 9. Each of the levers 7 and 8 is arranged to swing on the connection shaft 10 or the shaft pin 13 at its one end and to make the shaft pin 11 or 15 slidably engage the cam slot 12 or 14 at the other end.

In the case of the conventional device described above by way of example, the cam slot 12 which is one of a pair of cam slots is formed in a mounting chassis, i.e., the sliding chassis 5, while the other cam slot 14 is formed in the second lever 8. Generally, the cam slot 12 is either formed aslant, as in the case of this example, to cause the shaft pin 11 to move also downward accordingly as the cassette holder 6 is moved down, or formed in parallel to the horizontal surface of the sliding chassis 5.

The balance of force between the locking side and the non-locking side of the link mechanism obtained in the locked state of the conventional device as shown in FIG. 9(b) will be considered. The torque T brought about by the phase difference "h" causes the shaft pin 11 of the first lever 7 to abut on the cam slot 12 of the sliding chassis 5. Therefore, a reaction force acting on the first lever 7 becomes F which is a resultant force of a component N perpendicular to the cam slot 12 and a frictional resistance $\mu$N, as shown in FIG. 9(b). This reaction force F can be made into component forces Fx and Fy by resolving it into x and y components as shown also in FIG. 9(b). The component force Fx is exerted in the direction of moving the cassette holder 6 upward (as shown by an arrow u in the drawing) and thus decreases the torque T applied for holding the cassette holder 6. Besides, the direction of the reaction force F is disadvantageous in a case where some external force happens to exert a lifting force on the cassette holder 6. This results in a weaker holding force. Therefore, in order to accurately hold the tape cassette 1, it is necessary to increase the phase difference "h" of the first lever 7.

In the popped-up state shown in FIG. 9(a), on the other hand, when the cassette holder 6 is pushed down in this state, a reaction force applied from the cam slot 12 to the first lever 7 becomes a resultant force Fo of a vertical component No and a frictional resistance $\mu$No. Meanwhile, a moment M of a counterclockwise swing of the first lever 7 taking place on the connection shaft 10 can be expressed as M=Lo×Fo, as shown in FIG. 9(a). Since the arm Lo of moment is long, the value of the moment M becomes large. Hence, the pushing-down force on the cassette holder 6 easily causes the first lever 7 to swing counterclockwise and the shaft pin 11 to move downward within the cam slot 12 in the direction of arrow d, so that the first lever 7 swings in the direction of closing the link. Therefore, there is only a weak resistance to the downward pushing force on the cassette holder 6. The feeling of a tape cassette mounting operation varies with the individual operator. However, with reduction in weight of the cassette mounting device attained, such a weak resistance tends to give a keeling of lack of rigidity (as the cassette holder 6 moves up and down too readily in response to a slight pushing force) to impair the touch of high-quality and reliability of the device.

SUMMARY OF THE INVENTION

It is an object of this invention to provide a cassette mounting device which is arranged to be, for example, of the single-sided lock type for reduction in size and weight thereof and yet to be capable of accurately and reliably holding a cassette holder in its lowered position and to adequately give the operator a feeling of rigidity in pushing down the cassette holder, or to provide a recording and/or reproducing apparatus which is provided with such a cassette mounting device.

To attain the above-stated object, a cassette mounting device according to this invention comprises a chassis, a holder for holding a cassette, a pair of link mechanisms disposed respectively on two opposite sides of the holder and arranged to connect the holder to the chassis, each of the pair of link mechanisms having a first lever and a second lever which are interconnected in an X-like shape to be respectively swingable about a connection point at which the first lever and the second lever are interconnected, and a connection member arranged to connect the first levers of the pair of link mechanisms to each other at respective first end parts of the first levers, wherein each of the first levers has the first end part swingably connected to the holder and has a second end part arranged to engage the chassis in such a way as to be movable over the chassis in a direction of approaching the holder according to an approaching operation of the holder toward the chassis, and wherein each of the second levers has one end part swingably connected to the chassis.

To attain the above-stated object from another point of view, a recording and/or reproducing apparatus according to this invention comprises a first chassis on which a head for recording and/or reproduction is disposed, a second chassis arranged to be movable relative to the first chassis, a holder for holding a cassette, a pair of link mechanisms disposed respectively on two opposite sides of the holder and arranged to connect the holder to the second chassis, each of the pair of link mechanisms having a first lever and a second lever which are interconnected in an X-like shape to be respectively swingable about a connection point at which the first lever and the second lever are interconnected, and a connection member arranged to connect the first levers of the pair of link mechanisms to each other at respective first end parts of the first levers, wherein each of the first levers has the first end part swingably connected to the holder and has a second end part arranged to engage the second chassis in such a way as to be movable over the second chassis in a direction of approaching the holder according to an approaching operation of the holder toward the second chassis, and wherein each of the second levers has one end part swingably connected to the second chassis.

The above and other objects and features of this invention will become apparent from the following detailed description of embodiments thereof taken in connection with the accompanying drawings.

DETAILED DESCRIPTION OF THE PREFERRED EMBODIMENTS

Preferred embodiments of this invention are described below with reference to FIGS. 1(a) and 1(b) to FIGS. 5(a) and 5(b).

Figure 1A:
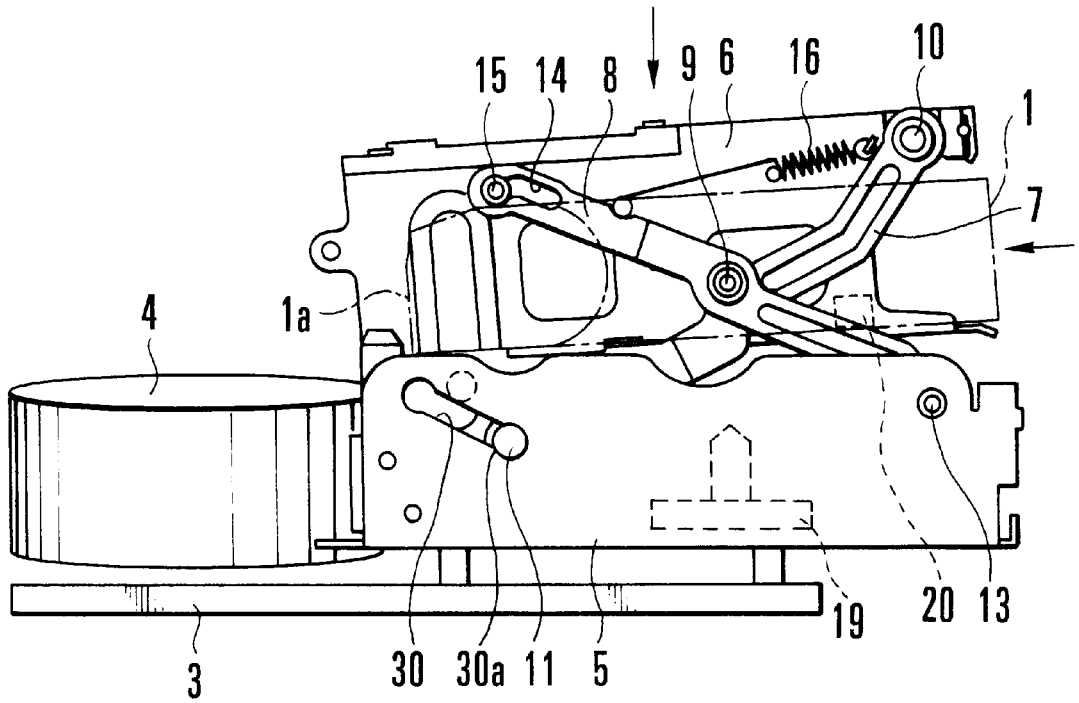
FIGS. 1(a) and 1(b) are side views showing the whole cassette mounting device of a first embodiment of this invention.
Figure 1B:
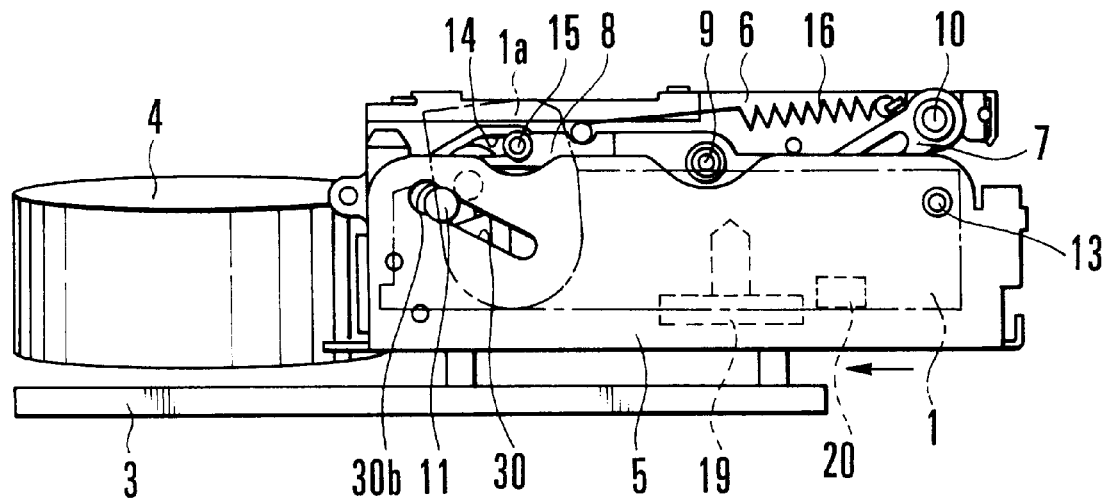
Figure 2:
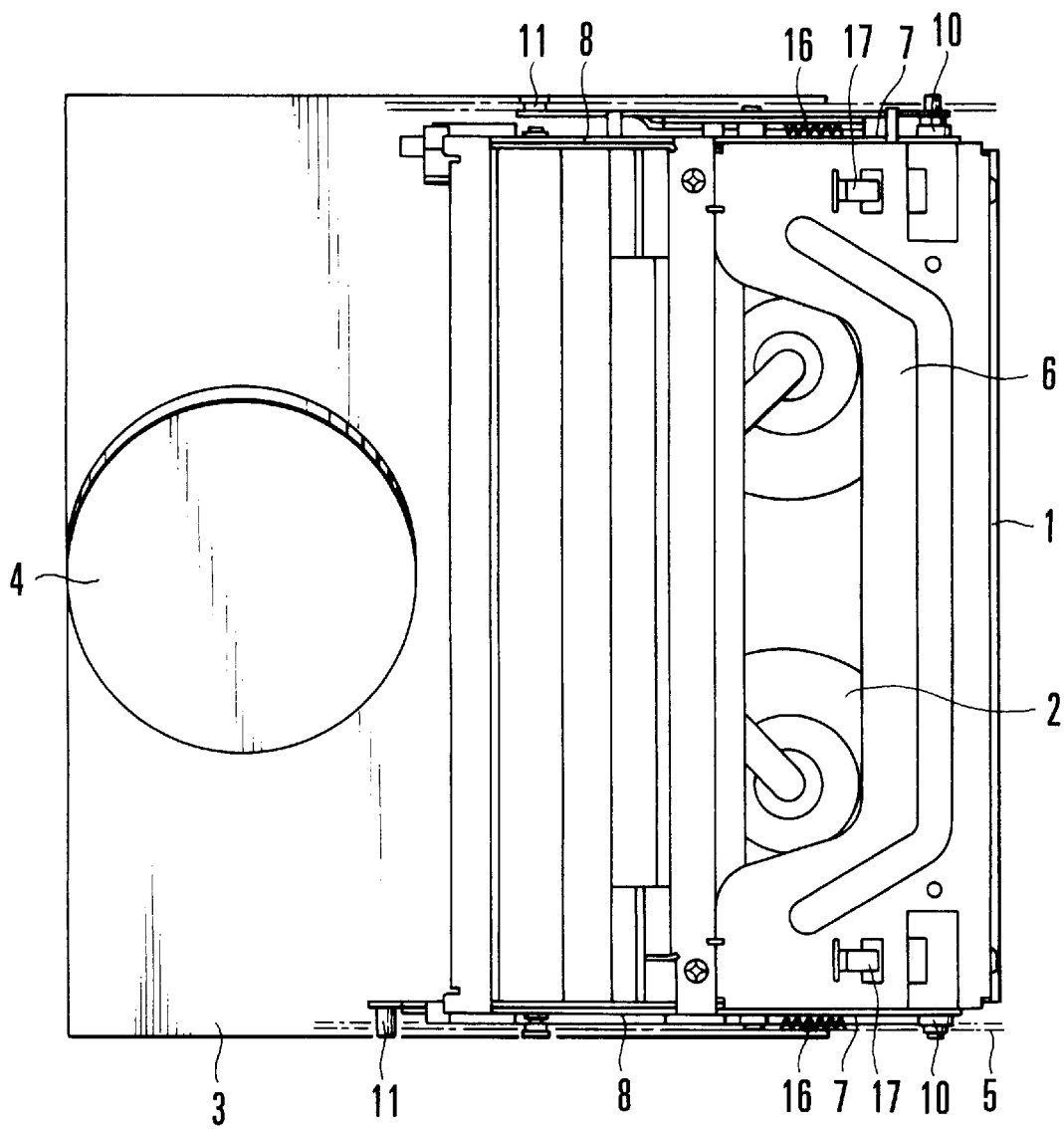
FIG. 2 is a top view showing the whole cassette mounting device of the first embodiment.
Figure 3A:
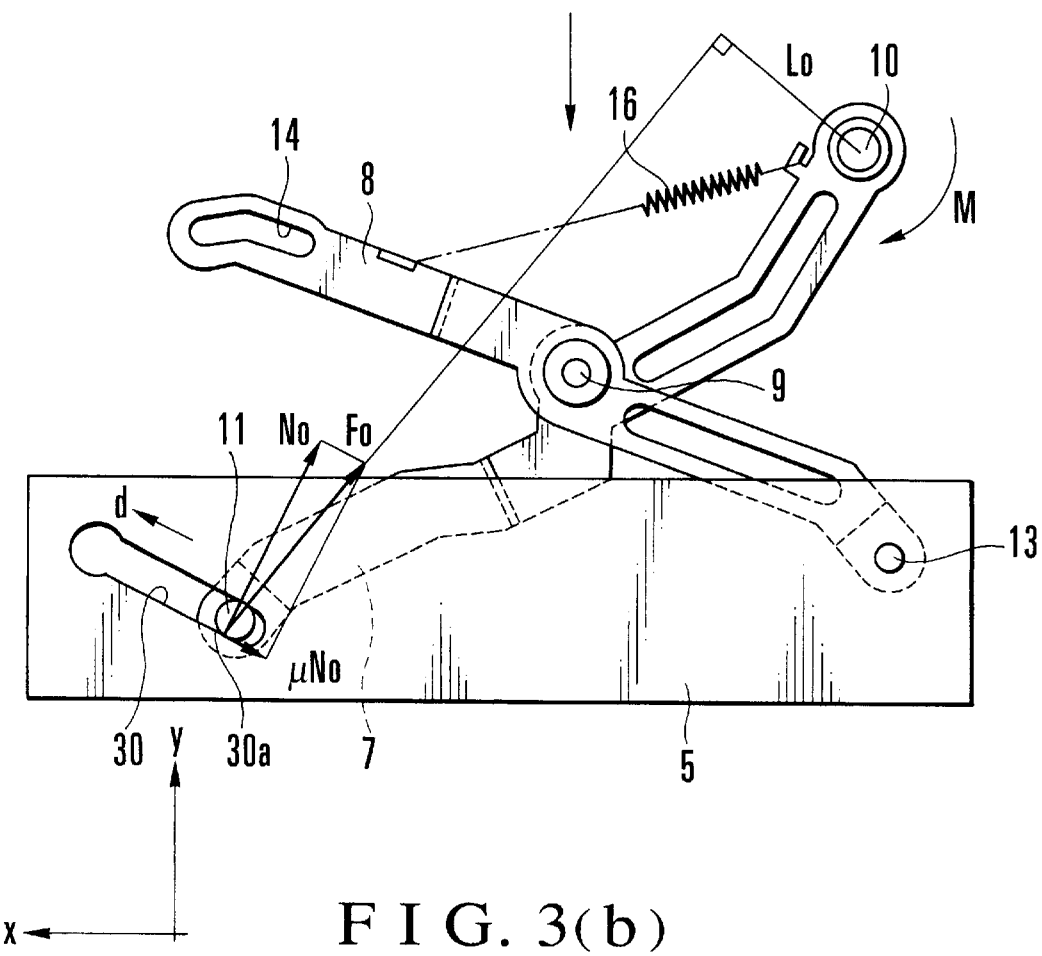
FIGS. 3(a) and 3(b) are side views showing essential parts of the first embodiment and how forces are exerted in the first embodiment.
Figure 3B:
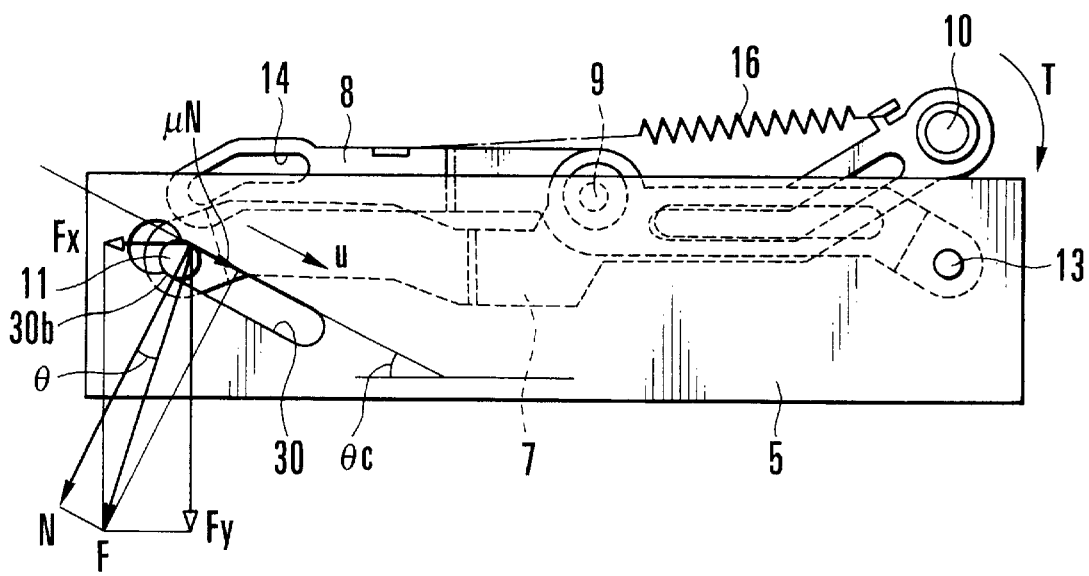

FIGS. 1(a) and 1(b) to FIGS. 3(a) and 3(b) show a first embodiment of this invention. FIGS. 1(a) and 1(b) are side views of the whole cassette mounting device of the first embodiment showing one side opposite to a locking side of the cassette mounting device. The cassette mounting device is shown as in a popped-up state in FIG. 1(a) and as in a locked state in FIG. 1(b). FIG. 2 is a top view of the whole cassette mounting device. FIGS. 3(a) and 3(b) are side views taken from the one side opposite to the locking side to show how forces are exerted on the link mechanism. The cassette mounting device is shown as in the popped-up state in FIG. 3(a) and as in the locked state in FIG. 3(b).

Referring to FIG. 1(a), a tape cassette 1 is inserted into a cassette holder 6 in the direction of an arrow. The cassette holder 6 is then pushed down to the position of FIG. 1(b), where the cassette holder 6 is locked by a lock mechanism 20 which is disposed on the side opposite to the side shown. The basic action and actions to be performed thereafter as a VTR are the same as in the case of the conventional device. All the parts of the embodiment that are arranged in substantially the same manner as those of the conventional device are indicated by the same reference numerals as those used in the foregoing description of the prior art, and details of them are omitted from the following description. In the case of this embodiment, however, the connection shaft 10 which serves to adjust the phases of the links on right and left sides of the cassette holder 6 to each other is disposed, unlike the conventional device, in a position near to the cassette inserting opening, for the purpose of more effectively giving the feeling of rigidity, because a load of pushing down the cassette holder 6 is mainly located near the cassette inserting opening. With the exception of this, other points of the basic arrangement of this embodiment are the same as those of the conventional device described.

A feature of this embodiment lies in that, unlike the conventional device, the form of a cam slot 30 provided in each of the side plates of the sliding chassis 5 has such an inclination as to cause the shaft pin 11 of the first lever 7 to move upward according to the descent of the cassette holder 6. The inclination of the cam slot 30 may be set at least at a part 30a which corresponds to the raised position of the cassette holder 6 and at a part 30b which corresponds to the lowered position of the cassette holder 6. In the case of this embodiment, however, the cam slot 30 is formed in a linear shape at a predetermined angle of inclination. The advantageous action of the cam slot 30 is described below with reference to FIGS. 3(a) and 3(b).

In the locked state as shown in FIG. 3(b), the phase difference which is imparted to the first lever 7, as mentioned in the foregoing, causes a reaction force on the first lever 7 due to the torque T acting on the sliding chassis 5 to become a resultant force F of the component N perpendicular to the cam slot 30 and the frictional resistance $\mu$N, in the same manner as described in the foregoing. The coefficient $\mu$ of friction between the shaft pin 11 and the cam slot 30 must be obtained by actual measurement. However, assuming that the frictional coefficient $\mu$ is 0.2, an angle $\theta$ between the component N and the reaction force F becomes as expressed below:

$$\theta = \tan^{-1}\mu = \tan^{-1} 0.2 = 11.30°$$

With this reaction force F resolved into x and y components and with the angle of inclination of the cam slot 30 relative to the horizontal surface of the sliding chassis 5 (horizontal surface of the tape cassette 1) assumed to be $\theta C$, these components Fx and Fy can be expressed as follows:

$$Fx = F \sin(\theta C - \theta) = F \sin(\theta C - \tan^{-1}\mu)$$

$$Fy = F \cos(\theta C - \theta) = F \cos(\theta C - \tan^{-1}\mu)$$

As apparent also from FIG. 3(b), in the case of this embodiment, the component Fx is made to act in a direction reverse to the direction (indicated by an arrow "u") in which the shaft pin 11 moves when the cassette holder 6 ascends. By virtue of this arrangement, the phase difference imparted to the first lever 7 is allowed to effectively act, so that the cassette holder 6 i.e., the tape cassette 1, can be accurately and easily held on the side where there is provided no locking mechanism.

Further, with the cam slot 30 arranged to have the above-stated inclination, in a case where the cassette holder 6 happens to be lifted by some external force while it is in the above-stated locked state, the first lever 7 is caused to swing in the direction of twisting the connection shaft 10 further (in the counterclockwise direction). Therefore, the tape cassette 1 can t)e effectively held in position by effectively utilizing the torsional rigidity of the connection shaft 10.

In the case of this embodiment, the angle of inclination $\theta C$ of the cam slot 30 is set at 30°. The reaction force due to the phase difference can be prevented from acting in the direction of causing the tape cassette 1 to buoy up, by setting the angle of inclination $\theta C$ at such a value that never causes the component Fx to become negative. Therefore, the angle of inclination $\theta C$ of the cam slot 30 can be set at $$\theta C \geqq \tan^{-1} \mu$$

by setting the component to $$Fx = F \sin(\theta C - \tan^{-1}\mu) \geqq 0.$$

In a case where the shaft pin 11 is arranged, for example, to engage the cam slot 30 through a roller by mounting the roller on the shaft pin 11, the coefficient of friction $\mu$ is 0.05 to 0.1 or thereabout. There(fore, the angle of inclination $\theta C$ is preferably set at Least at $\theta C = \tan^{-1}\mu = \tan^{-1} 0.05 = 3°$.

Further, in a case where a ferrous metal material is used for the shaft pin 11 while the sliding chassis 5 having the cam slot 30 is made of an aluminum material, the coefficient of friction $\mu$ is approximately 0.1 to 0.2 or thereabout. In that case, the angle of inclination $\theta C$ is preferably set at least at $\theta C = \tan^{-1} = \tan^{-1} 0.1 = 6°$.

In the popped-up state as shown in FIG. 3(*a*), on the other hand, when the cassette holder 6 is pushed down, a reaction force Fo on the first lever 7 and the moment M around the connection shaft 10 become as shown in the drawing. Since the arm Lo of moment then becomes shorter than in the case of the conventional device, the moment M also becomes smaller. Therefore, even under the same amount of pushing-down force as in the conventional device, the cassette holder 6 is less readily moved down, thereby giving a greater feeling of rigidity than in the case of the conventional device. In addition, with the initial resistance to the pushing-down operation on the cassette holder 6 thus arranged to be larger, the cassette holder 6 necessitates exertion of a certain amount of force in pushing it down, so that the cassette holder 6 can be pushed down to its locked position in one stroke. Thus, the possibility of such a malfunction that the cassette holder 6 is caused to move upward again without being locked can be lessened.

Further, as apparent from the description of exertion of force described above, it is sufficient to set the inclination of the cam slot 30 at the parts 30*a* and 30*b* which correspond respectively to the popped-up position and the locked position of the cassette holder 6. In this respect, a second embodiment of this invention is arranged as shown in FIGS. 4(*a*) and 4(*b*).

Figure 4A:
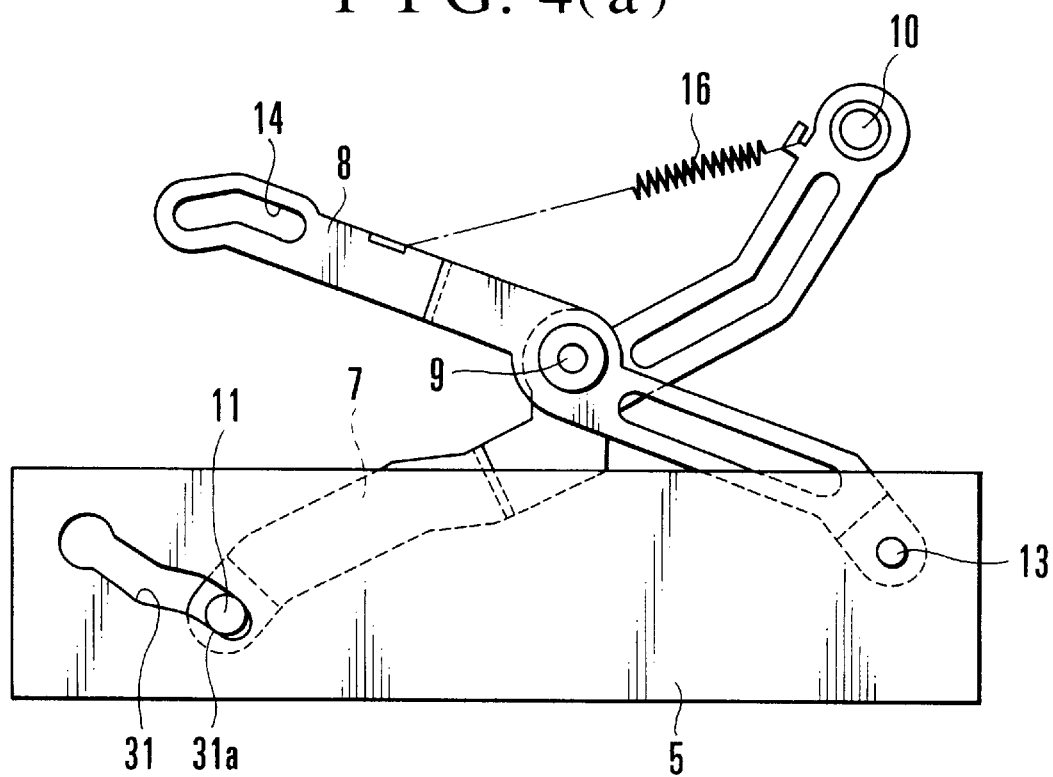
FIGS. 4(a) and 4(b) are side views showing essential parts of a second embodiment of this invention.
Figure 4B:
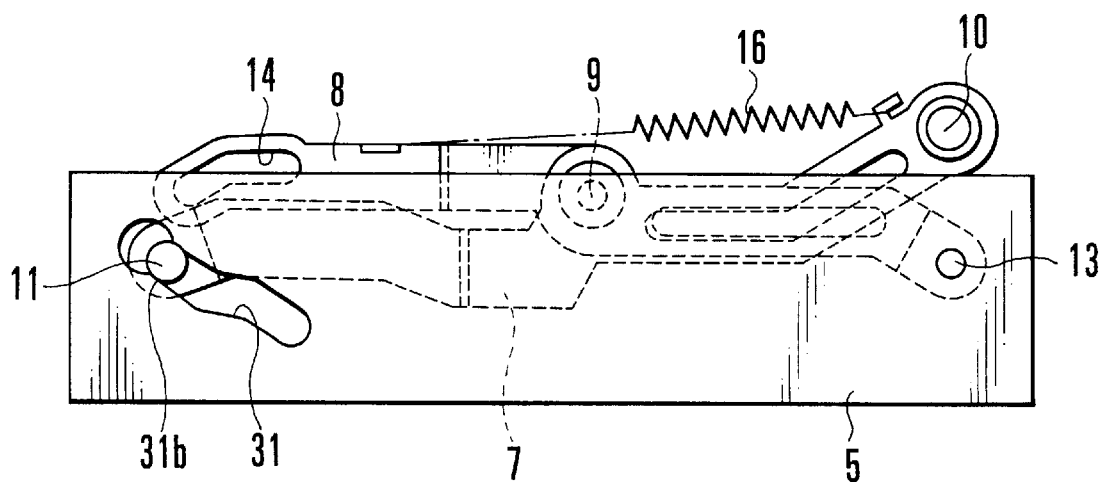
Figure 5A:
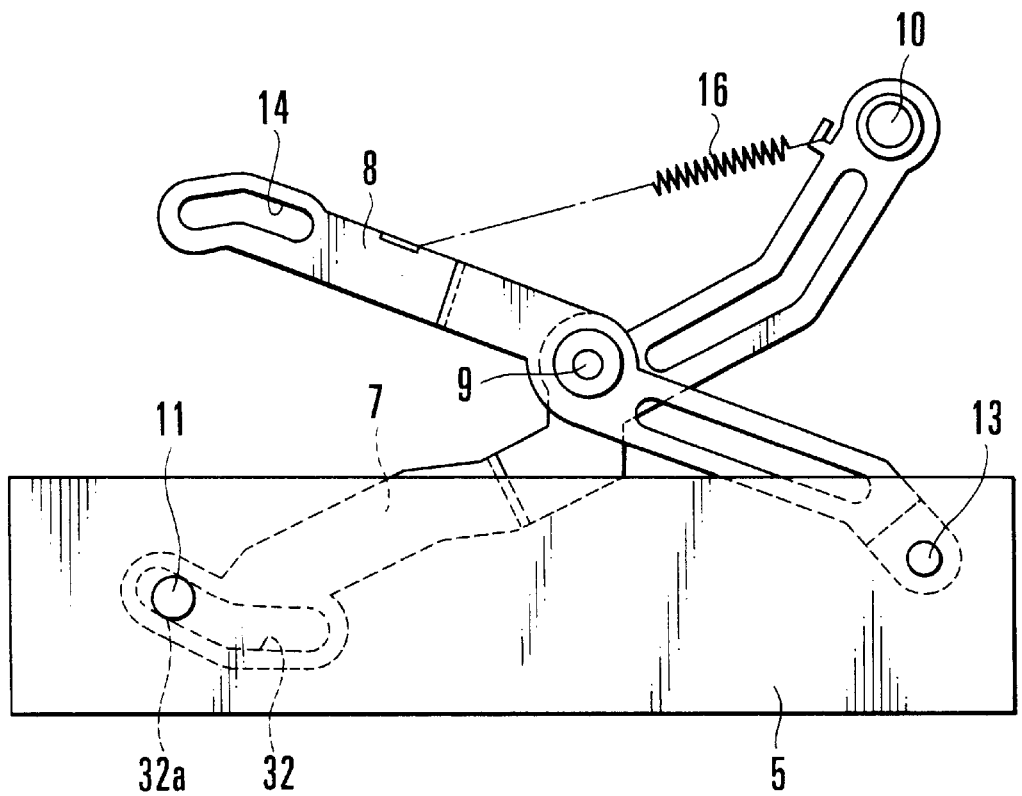
FIGS. 5(a) and 5(b) are side views showing essential parts of a third embodiment of this invention.
Figure 5B:
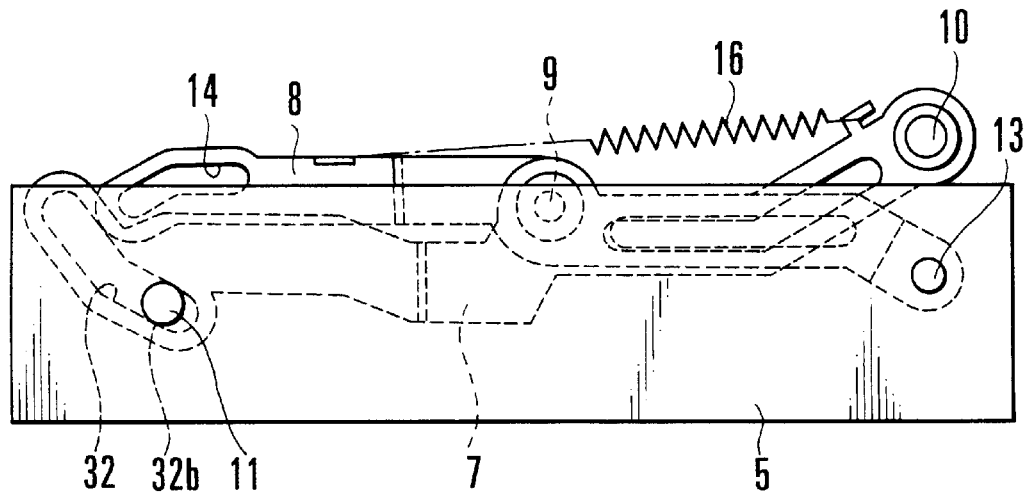
Figure 6A:
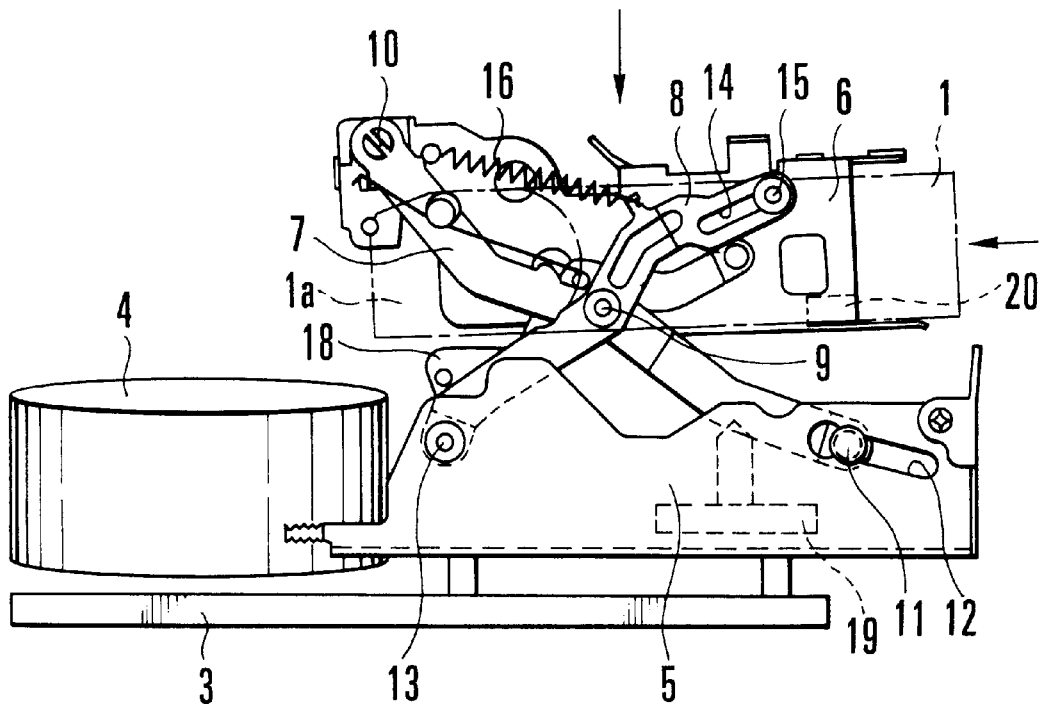
FIGS. 6(a) and 6(b) are side views showing the conventional device in its entirety.
Figure 6B:
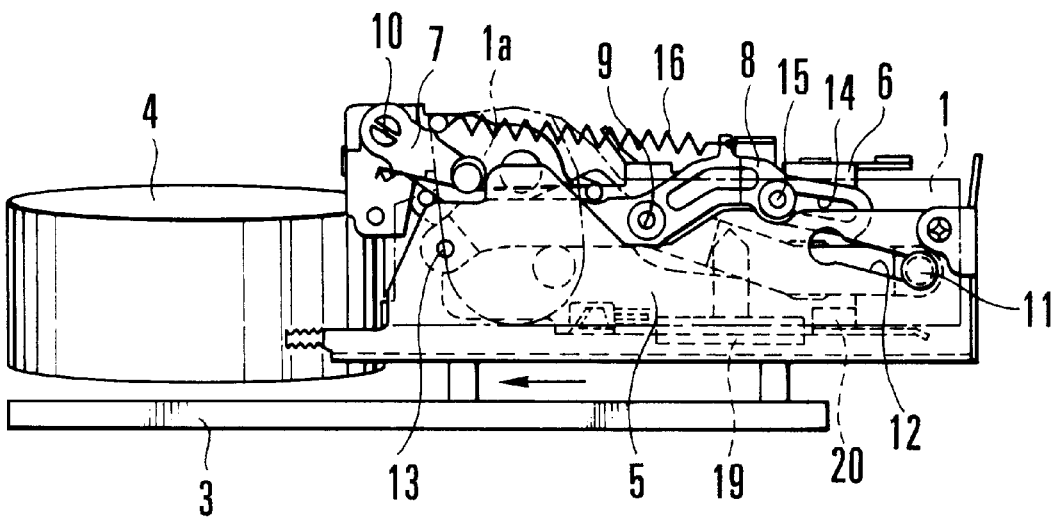
Figure 7:
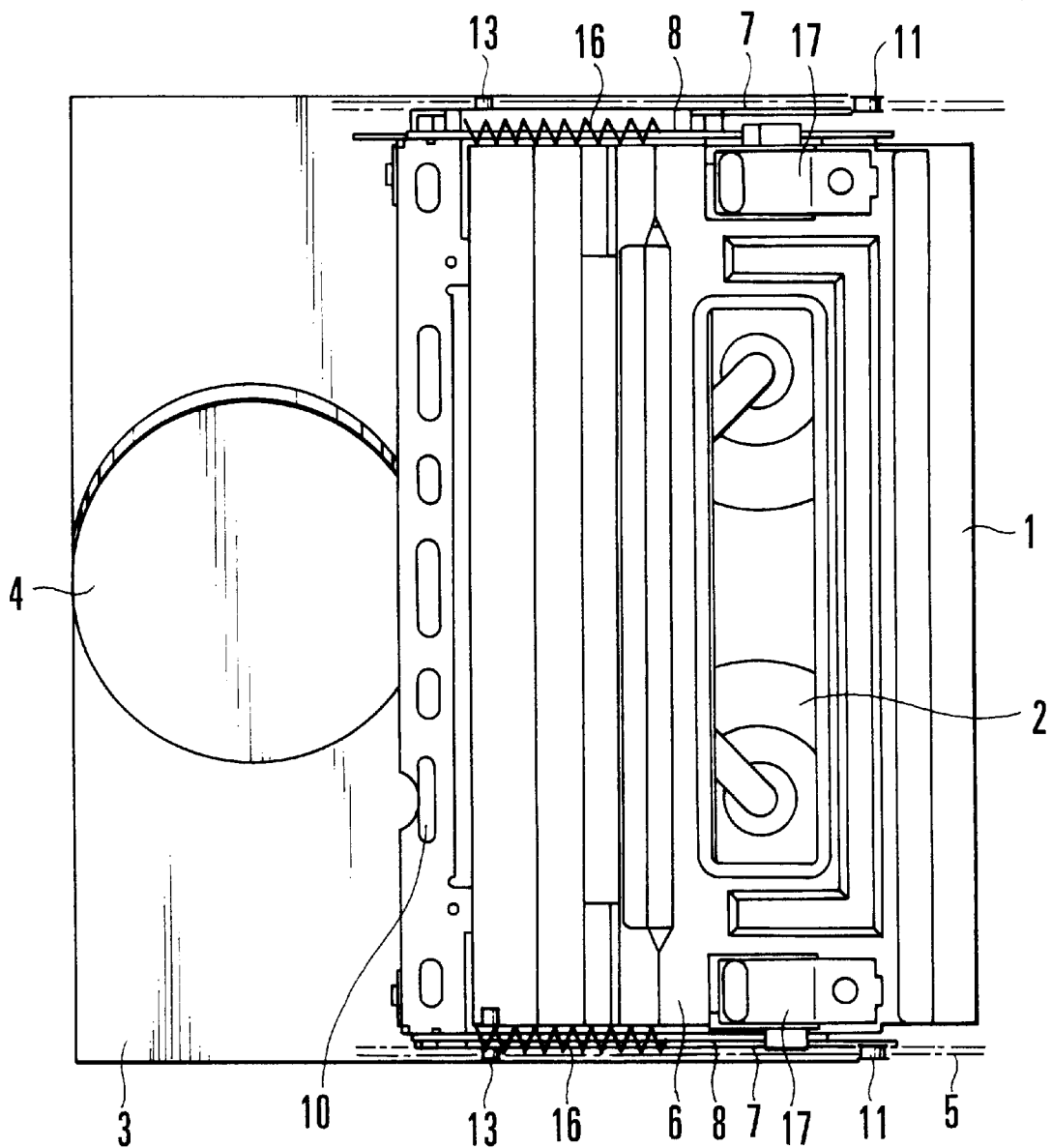
FIG. 7 is a top view showing the conventional device in its entirety.
Figure 8:
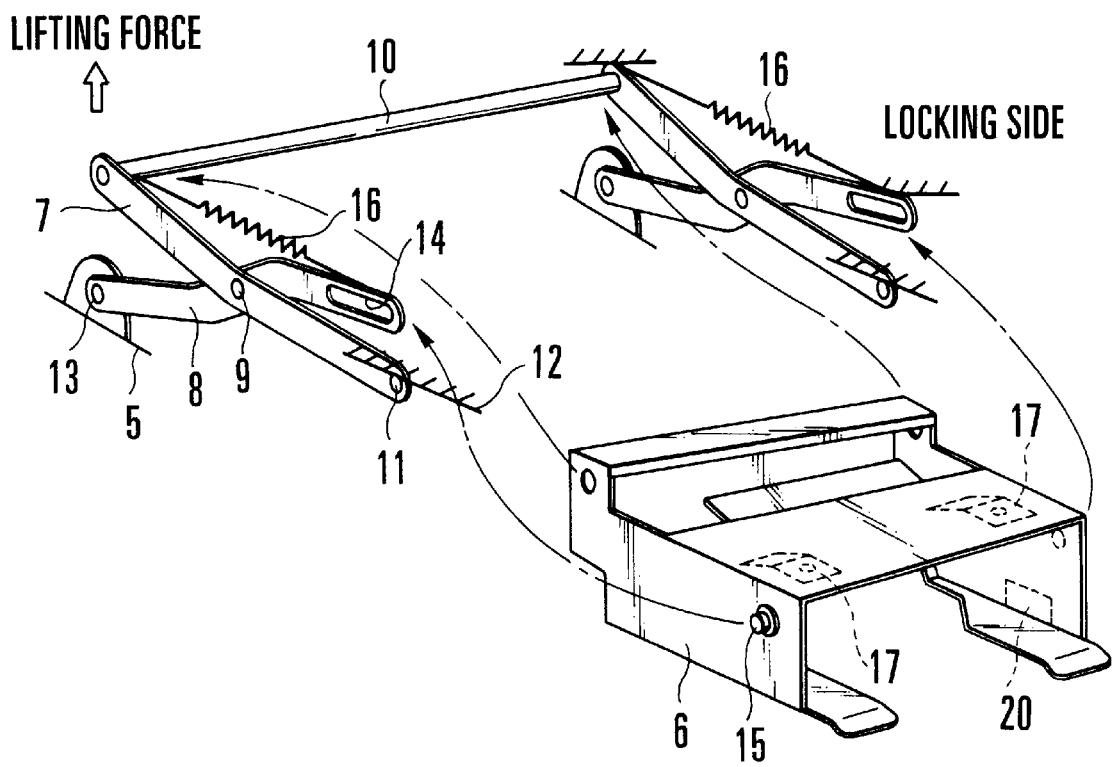
FIG. 8 is an exploded oblique view showing essential parts of the conventional device.
Figure 9A:
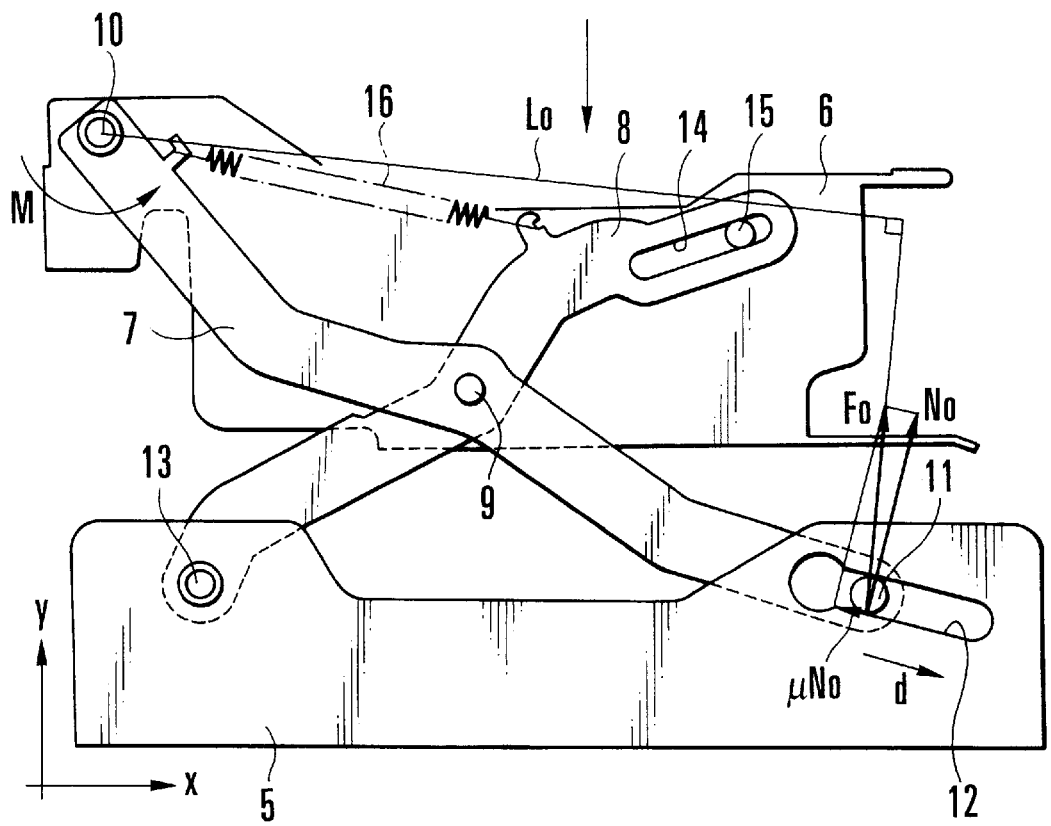
FIGS. 9(a) and 9(b) are side views showing essential parts of the conventional device and how forces are exerted in the conventional device.
Figure 9B:
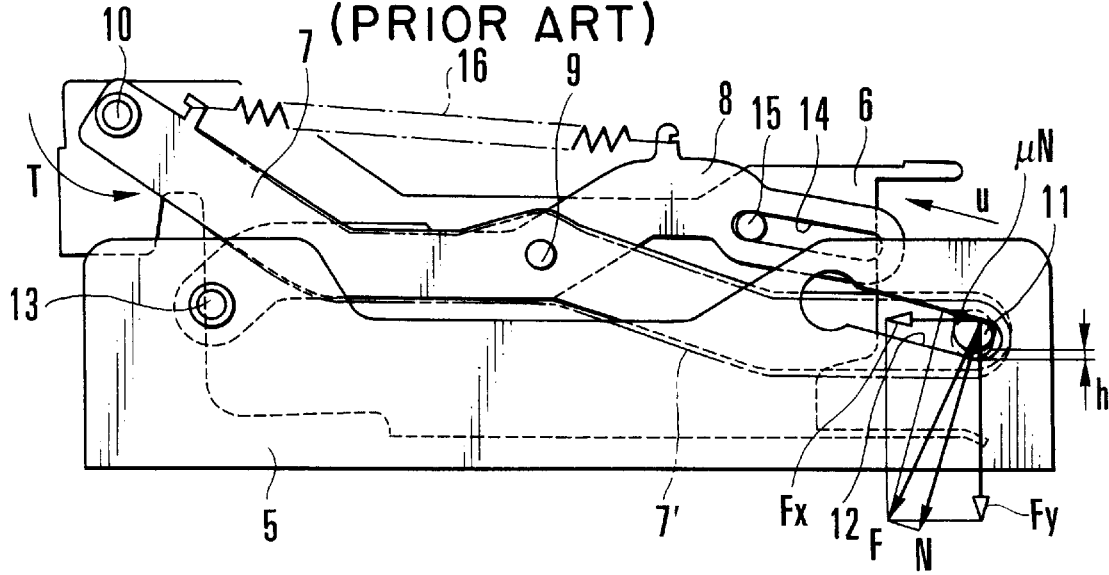

In the second embodiment which is shown in FIGS. 4(*a*) and 4(*b*), parts 31*a* and 31*b* of a cam slot 31 which correspond respectively to the popped-up position and the locked position of the cassette holder 6 are arranged to have necessary angles of inclination, while a part of the cam slot 31 between the parts 31*a* and 31*b* is allowed to have some other suitable angle of inclination. With the cam slot 31 arranged in this manner, actions can be carried out in the locked state and the popped-up state in exactly the same manner as in the case of the first embodiment. Therefore, the intermediate part of the cam slot 31 can be arranged in an optimum shape, either in a linear shape or in a curved shape, according to the moving locus of the cassette holder 6 necessary for its descent and the feeling of operation desired.

A third embodiment of this invention is next described with reference to FIGS. 5(*a*) and 5(*b*) as follows. In the first and second embodiments, the shaft pin 11 is disposed on the side of the first levers 7, and the cam slot 30 or 31 is disposed on the side of the sliding chassis 5. However, these parts may be conversely arranged. In the case of the third embodiment, a cam slot 32 is formed in the first lever 7, while the shaft pin 11 is disposed on the side of the sliding chassis 5. The cam slot 32 formed in the first lever, in this case, can be shaped in a manner similar to the cam slots of the first and second embodiments with the force of reaction of the shaft pin 11 to the cam slot 32 taken into consideration.

In the case of the third embodiment, the cam slot 32 moves relative to the shaft pin 11 of the sliding chassis 5 accordingly as the cassette holder 6 ascends or descends. Therefore, the inclination of the cam slot 32 is set in such a way as to cause the shaft pin 11 to relatively move downward within the cam slot 32 accordingly as the cassette holder 6 descends. Further, the angle of inclination of the cam slot 32 must be set to vary according to the movement of the first lever 7. Therefore, the angles of inclination of the cam slot 32 are set at least at parts 32*a* and 32*b* which respectively correspond to the raised position and the lowered position of the cassette holder 6, in the same manner as mentioned in the foregoing.

While this invention has been described through some of preferred embodiments thereof, this invention is not limited to these embodiments. Various modifications and applications of the arrangement described can be made according to the technological concept of this Invention. For example, while the cassette mounting device is mounted on a sliding chassis which is movable over a main chassis and the cam slot is arranged either on the side of the sliding chassis or on the side of the first lever in the embodiments described, the invented arrangement is of course likewise applicable to a case where a cam slot or cam slots are formed in a part by which the cassette mounting device is mounted on a mechanical chassis which does not slide.

According to the arrangement of the embodiments described, in a cassette mounting device arranged to cause a cassette holder to ascend and descend between a raised position and a lowered position by synchronizing X-shaped links disposed on both sides of the cassette holder and to lock the cassette holder in the lowered position, against the force of upward urging means, only on one side thereof with a phase difference provided, for example, between interconnected levers of the two X-shaped links, for simplification and reduction in weight of the mechanism, a tape cassette can be reliably held in its lowered position and the rigidity of a member which interconnects the two links can be effectively utilized. Further, a sufficient touch of rigidity can be imparted to the operation of pushing the cassette holder downward to improve the feeling of operation. The arrangement thus makes a good feeling of operation effectively compatible with adequate functions and strength, despite reduction in size and weight of the device, without necessitating the phase difference between levers to be increased to such an extent that tends to cause some deformation of the chassis and other parts which do not have much rigidity due to the reduction in size and weight.

Further, in a recording and/or reproducing apparatus which embodies this invention, a second chassis on which a tape cassette is to be mounted is arranged to be slidable over a first chassis on which a rotary drum is disposed. In a case where it is desired to reduce the size of the recording and/or reproducing apparatus, the cassette mounting device which is arranged to permit reduction in size and weight as mentioned in the foregoing is mounted on the second chassis, so that the recording and/or reproducing apparatus can be arranged to have a smaller size and a lighter weight. Besides, the arrangement according to this invention permits simplification of the second chassis supporting arrangement of the first chassis and a mechanism for moving the second chassis.

What is claimed is:

1. A cassette mounting device comprising:
   a) a chassis;
   b) a holder for holding a cassette;
   c) a pair of link mechanisms disposed respectively on two opposite sides of said holder and arranged to connect said holder to said chassis, each of said pair of link mechanisms having a first lever and a second lever which are interconnected in an X-like shape to be respectively swingable about a connection point at which said first lever and said second lever are interconnected; and d) a connection member arranged to connect said first levers of said pair of link mechanisms to each other at respective first end parts of said first levers, wherein each of said first levers has the first end part swingably connected to said holder and has a second end part arranged to engage said chassis in such a way as to be movable over said chassis in a direction approaching said holder in the course of said holder approaching said chassis, wherein each of said second levers has one end part swingably connected to said chassis, wherein each of said first levers is provided with a protruding part at the second end part thereof, and said chassis has slots formed therein and arranged to engage said protruding parts, wherein, an angle of inclination of said slots to a bottom surface of said chassis is $\Theta$ and a coefficient of friction between said slots and said protruding parts is $\mu$, $\Theta$ being greater than or equal to $\tan^{-1}\mu$, and wherein said protruding parts are formed of a ferrous material and wherein said slots are formed in an aluminum material and the angle of inclination $\Theta$ is set at 6 degrees or more.

2. A device according to claim 1, wherein said connection member is disposed adjacent to a cassette inserting opening of said holder.

3. A device according to claim 1, further comprising an urging member for urging said holder to move away from said chassis.

4. A device according to claim 1, wherein an urging member is disposed between said first lever and said second lever.

5. A recording and/or reproducing apparatus comprising:
a) a first chassis on which a head for recording and/or reproduction is disposed;
b) a second chassis arranged to be movable relative to said first chassis;
c) a holder for holding a cassette;
d) a pair of link mechanisms disposed respectively on two opposite sides of said holder and arranged to connect said holder to said second chassis, each of said pair of link mechanisms having a first lever and a second lever which are interconnected in an X-like shape to be respectively swingable about a connection point at which said first lever and said second lever are interconnected; and
e) a connection member arranged to connect said first levers of said pair of link mechanisms to each other at respective first end parts of said first levers, wherein each of said first levers has the first end part swingably connected to said holder and has a second end part arranged to engage said second chassis in such a way as to be movable over said second chassis in a direction approaching said holder in the course of said holder approaching said second chassis, wherein each of said second levers has one end part swingably connected to said second chassis, and wherein each of said first levers is provided with a protruding part at a second part thereof, and said second chassis has a slot formed therein and arranged to engage one of said protruding parts, wherein an angle of inclination of said slot to a bottom surface of said chassis is $\Theta$ and a coefficient of friction between said slot and said one of said protruding parts is $\mu$, $\Theta$ being greater than or equal to $\tan^{-1}\mu$, and wherein said one of said protruding parts is formed of a ferrous material and wherein said slot is formed in an aluminum material and the angle of inclination $\Theta$ is set at 6 degrees or more.

6. An apparatus according to claim 5, wherein said connection member is disposed adjacent to a cassette inserting opening of said holder.

7. An apparatus according to claim 5, further comprising an urging member for urging said holder to move away from said second chassis.

8. An apparatus according to claim 7, wherein said urging member is disposed between said first lever and said second lever.

* * * * *

UNITED STATES PATENT AND TRADEMARK OFFICE
CERTIFICATE OF CORRECTION

PATENT NO. : 6,072,658
DATED : June 6, 2000
INVENTOR(S) : Kiyoshi Kumagai

It is certified that error appears in the above-identified patent and that said Letters Patent is hereby corrected as shown below:

Column 1,
Line 32, delete "single-side(d lock" and insert -- single-sided lock --.
Line 36, delete "t-he" and insert -- the --.
Line 58, delete "dispose(d" and insert -- disposed --.

Column 2,
Line 8, "Reel mounts ..." should not be a new paragraph.

Column 4,
Line 15, delete "keeling" and insert -- feeling --.

Column 6,
Line 32, delete "11.30" and insert -- 11.3 --.
Line 58, delete "t)e" and insert -- be --.

Column 7,
Line 9, delete "There(fore" and insert -- Therefore --.
Line 10, delete "at Least at" and insert -- at least at --.

Column 8,
Line 17, delete "Invention" and insert -- invention --.

Signed and Sealed this

Eleventh Day of September, 2001

Attest:

NICHOLAS P. GODICI
Attesting Officer
Acting Director of the United States Patent and Trademark Office